(12) United States Patent
    Crutchfield

(10) Patent No.: US 10,392,957 B2
(45) Date of Patent: Aug. 27, 2019

(54) CERAMIC MATRIX COMPOSITE BLADE TRACK WITH MOUNTING SYSTEM HAVING LOAD DISTRIBUTION FEATURES

(71) Applicant: Rolls-Royce Corporation, Indianapolis, IN (US)

(72) Inventor: Jeffrey M. Crutchfield, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 146 days.

(21) Appl. No.: 15/725,494

(22) Filed: Oct. 5, 2017

(65) Prior Publication Data

US 2019/0107002 A1    Apr. 11, 2019

(51) Int. Cl.
    *F01D 11/08*    (2006.01)
    *F01D 25/00*    (2006.01)

(52) U.S. Cl.
    CPC ............ *F01D 11/08* (2013.01); *F01D 25/005* (2013.01); *F05D 2220/32* (2013.01); *F05D 2240/11* (2013.01); *F05D 2250/75* (2013.01); *F05D 2300/6033* (2013.01)

(58) Field of Classification Search
    CPC ........ F01D 11/08; F01D 25/005; F01D 11/12; F01D 11/18; F05D 2220/32; F05D 2240/11; F05D 2250/75
    USPC ...................................................... 415/173.1
    See application file for complete search history.

(56) References Cited

U.S. PATENT DOCUMENTS

| | | |
|---|---|---|
| 4,576,548 A | 3/1986 | Smed et al. |
| 4,759,687 A | 7/1988 | Miraucourt et al. |
| 5,603,510 A | 2/1997 | Sanders |
| 6,048,170 A | 4/2000 | Dodd |
| 6,062,813 A | 5/2000 | Halliwell et al. |
| 6,315,519 B1 | 11/2001 | Bagepalli et al. |
| 6,572,115 B1 | 6/2003 | Sarshar et al. |
| 6,726,448 B2 | 4/2004 | McGrath et al. |
| 6,733,233 B2 | 5/2004 | Jasklowski et al. |
| 6,932,566 B2 | 8/2005 | Suzumura et al. |
| 6,942,203 B2 | 9/2005 | Schroder et al. |
| 7,189,057 B2 | 3/2007 | Lee et al. |
| 7,207,771 B2 | 4/2007 | Synnott et al. |
| 7,229,246 B2 | 6/2007 | Ghasripoor et al. |
| 7,238,002 B2 | 7/2007 | Cairo et al. |
| 7,435,049 B2 | 10/2008 | Ghasripoor et al. |
| 7,726,936 B2 | 6/2010 | Keller et al. |
| 8,047,773 B2 | 11/2011 | Bruce et al. |
| 8,257,029 B2 | 9/2012 | Habarou et al. |
| 8,834,105 B2 | 9/2014 | Albers et al. |

(Continued)

FOREIGN PATENT DOCUMENTS

DE    102009003423 A1    8/2009
EP         844369 A1    5/1998

(Continued)

*Primary Examiner* — Nathaniel E Wiehe
*Assistant Examiner* — David Whittaker
(74) *Attorney, Agent, or Firm* — Barnes & Thornburg LLP

(57) ABSTRACT

An assembly adapted for use in a gas turbine engine has a carrier component and a supported component. The assembly includes a mounting system for coupling the supported component to the carrier component. In an illustrative embodiment, the assembly is a turbine shroud segment for blocking gasses from passing over turbine blades included in the gas turbine engine.

20 Claims, 9 Drawing Sheets

(56) References Cited

U.S. PATENT DOCUMENTS

| | | |
|---|---|---|
| 9,249,684 B2 | 2/2016 | Lazur et al. |
| 9,593,596 B2 | 3/2017 | Uskert et al. |
| 2002/0192074 A1 | 12/2002 | Turnquist et al. |
| 2003/0102630 A1 | 6/2003 | Dinc et al. |
| 2004/188947 A1 | 9/2004 | Paprotna |
| 2006/0067815 A1 | 3/2006 | Ghasripoor et al. |
| 2009/0123278 A1 | 5/2009 | Audeon et al. |
| 2012/0027572 A1 | 2/2012 | Denece et al. |
| 2012/0243977 A1 | 9/2012 | Simonet |
| 2013/0202430 A1 | 8/2013 | Gaudry et al. |
| 2014/0147266 A1 | 5/2014 | Kramer |
| 2015/0377050 A1 | 12/2015 | Freeman et al. |
| 2016/0102572 A1 | 4/2016 | O'Leary |
| 2016/0290140 A1 | 10/2016 | Thomas et al. |
| 2017/0260869 A1 | 9/2017 | Vetters et al. |
| 2018/0149042 A1* | 5/2018 | Freeman .............. F01D 11/005 |

FOREIGN PATENT DOCUMENTS

| | | |
|---|---|---|
| EP | 1643172 A1 | 4/2006 |
| EP | 2357322 A2 | 8/2011 |
| JP | 61152906 A | 7/1986 |
| WO | 2010103213 A1 | 9/2010 |

\* cited by examiner

CERAMIC MATRIX COMPOSITE BLADE TRACK WITH MOUNTING SYSTEM HAVING LOAD DISTRIBUTION FEATURES

FIELD OF THE DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional fasteners such as rivets or bolts may present problems related to thermal expansion and/or material properties of the ceramic matrix composite components.

SUMMARY

The present disclosure may comprise one or more of the following features and combinations thereof.

According to the present disclosure, a turbine shroud segment adapted for use in a gas turbine engine includes a carrier segment, a blade track segment, and a mounting system. The carrier segment comprises metallic materials and the blade track segment comprises ceramic matrix composite materials. The blade track segment is formed to include a runner shaped to extend partway around a central axis and an attachment portion that extends radially outward from the runner. The mounting system is configured to couple the blade track segment to the carrier segment.

In illustrative embodiments, the mounting system includes a brace formed to include a bracket that engages the attachment portion of the blade track segment and a plurality of attachment shafts that extend from the bracket through the carrier to couple the blade track segment to the carrier segment. The bracket of the brace includes a support body from which the attachment shafts extend, track-location arms, and load-distribution arms. The track-location arms engage the attachment portion of the blade track segment and provide rigid loading points for the blade track segment. The load-distribution arms engage the attachment portion of the blade track segment. The load-distribution arms are configured to be less rigid than the track-location arms so that the load-distribution arms provide spring load points that distribute mounting loads applied to the blade track segment to locations spaced apart from the rigid loading points provided by the track-location arms.

In illustrative embodiments, the track-location arms each include a cantilevered boom that extends from the support body and an engagement pad that extends radially from the cantilevered boom into contact with the attachment portion of the blade track segment. The cantilevered booms of the track location arms are L-shaped and each have a first portion and a second portion. The first portion of each track-location arm extends radially inward from the support body and the second portion of each track-location arm extends axially from the first portion. The engagement pad of each track-location arm extends radially outward from the second portion of the cantilevered boom and is spaced apart from the first portion of the cantilevered boom.

In illustrative embodiments, the load-distribution arms each include a cantilevered boom that extends from the support body and an engagement pad that extends radially from the cantilevered boom into contact with the attachment portion of the blade track segment. The cantilevered boom of each load-distribution arm is configured to be less rigid than the cantilevered boom of the track-location arm. The cantilevered boom of each load-distribution arm is L-shaped and has a first portion and a second portion. The first portion extends radially inward from the support body and the second portion extends axially from the first portion. The engagement pad of each load-distribution arm extends radially outward from the second portion of the cantilevered boom and is spaced apart from the first portion of the cantilevered boom.

In illustrative embodiments, the mounting system includes threaded nuts. The threaded nuts are engaged with threads formed on the shafts of the brace such that the nuts are configured to be rotated to move the brace relative to the carrier segment.

In illustrative embodiments, the brace includes the plurality of shafts are circumferentially spaced apart shafts that extend from the bracket through the carrier. At least one of the shafts does not extend perpendicular to the central axis.

In illustrative embodiments, the attachment portion of the blade track segment has a T-shape when viewed in the circumferential direction with a stem that extends radially outward from the runner and an attachment panel that extends radially forward and aft from the stem. Accordingly, the entire blade track segment has a generally I-beam shape when viewed in the circumferential direction. The track-location arms and the load-distribution arms engage a radially-inwardly facing surface of the attachment panel included in the blade track segment.

According to another aspect of the present disclosure, a turbine shroud segment adapted for use in a gas turbine engine includes a carrier segment, a blade track segment, and a mounting system configured to couple the blade track segment to the carrier segment. The carrier segment comprises metallic materials and the blade track segment comprises ceramic matrix composite materials. The blade track segment is formed to include a runner shaped to extend partway around a central axis and an attachment portion that extends radially outward from the runner. The mounting system includes a plurality of braces and a plurality of threaded nuts engaged with the braces. Each brace includes at least one threaded shaft that extends through the carrier into a threaded nut and a bracket engaged with the blade track segment.

In illustrative embodiments, the bracket of each brace includes a support body, track-location arms, and at least one load-distribution arm. The track-location arms engage the attachment portion of the blade track segment. The at least one load-distribution arm is sized to be less rigid than any one of the track-location arms and engages the attachment portion of the blade track segment.

In illustrative embodiments, the at least one load-distribution arm includes a cantilevered boom that extends from the support body. The track-location arms each include a cantilevered boom that extends from the support body and that is larger in size than the cantilevered boom of the load distribution arms so as to be more rigid than the load-distribution arms.

In illustrative embodiments, the cantilevered boom of the load-distribution arm is L-shaped and has a first portion and a second portion, the first portion extends radially inward from the support body and the second portion extends axially from the first portion. Each load-distribution arm includes an engagement pad and the engagement pad of each load-distribution arm extends radially outward from the second portion of the cantilevered boom into contact with the attachment portion of the blade track segment.

In illustrative embodiments, each brace includes a plurality of spaced apart threaded shafts that extend from the support body through the carrier. At least one of the shafts does not extend perpendicular to the central axis.

According to yet another aspect of the present disclosure, an assembly includes a carrier component, a supported component, and a mounting system configured to couple the supported component to the carrier component. The carrier component comprises metallic materials and the supported component comprises ceramic matrix composite materials. The supported component is formed to include a shield portion adapted to face a hot environment when the assembly is in use and an attachment portion that extends from the shield portion.

In illustrative embodiments, the mounting system includes a plurality of braces and a plurality of threaded nuts engaged with the braces. Each brace includes at least one threaded shaft that extends through the carrier component into a corresponding threaded nut and a bracket engaged with the blade track segment.

In illustrative embodiments, the bracket of each brace includes a support body, component-location arms, and load-distribution arms. The component-location arms engage the attachment portion of the second component. The load-distribution arms are configured to be less rigid than the component-location arms that engage the attachment portion of the second component.

These and other features of the present disclosure will become more apparent from the following description of the illustrative embodiments.

DETAILED DESCRIPTION OF THE DRAWINGS

Figure 1:
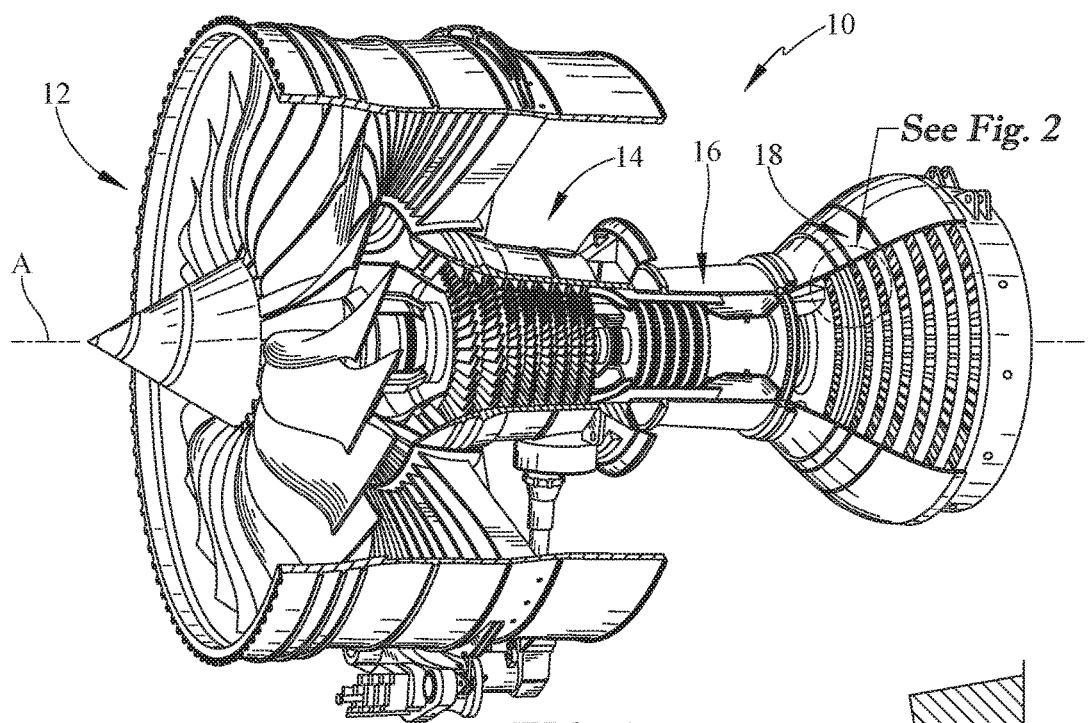
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
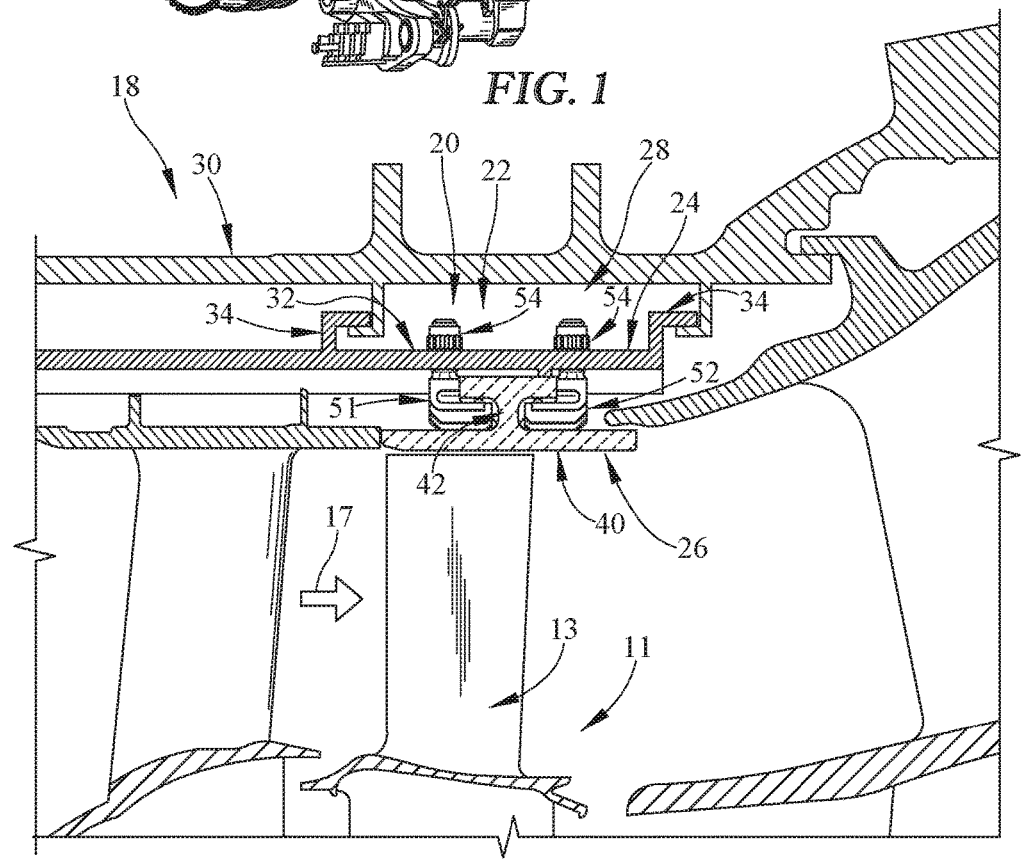
FIG. 2 is a partial cross-sectional view of the gas turbine engine of FIG. 1 showing the arrangement of a segmented turbine shroud radially outward from blades of a turbine wheel assembly to suggest that the turbine shroud blocks gasses from passing over the blades without interacting with the blades.

The turbine 18 includes at least one turbine wheel assembly 11 and a turbine shroud 20 positioned to surround the turbine wheel assembly 11 as shown in FIGS. 1 and 2. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
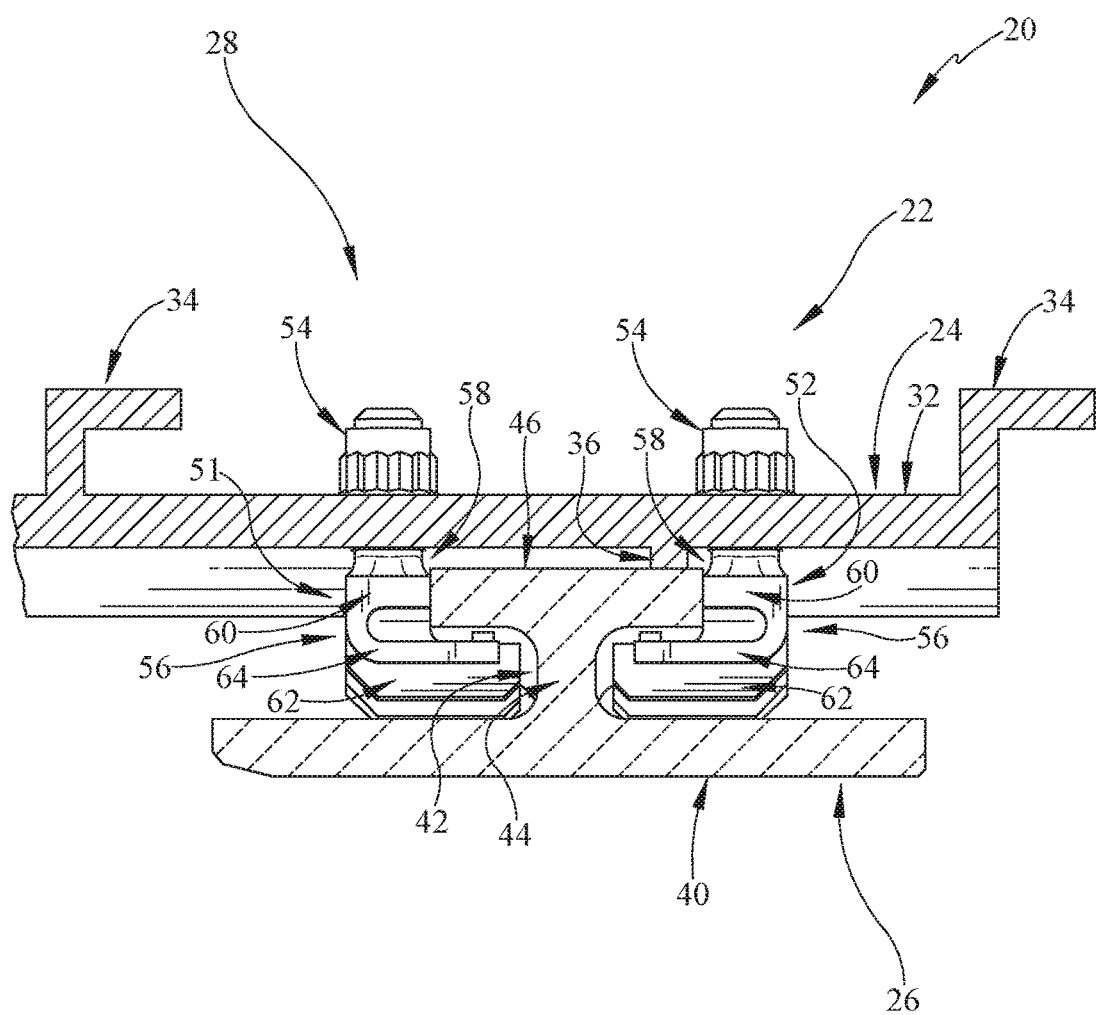
FIG. 3 is a detail view of a portion of FIG. 2 showing a turbine shroud segment that includes a carrier segment, a blade track segment, and a mounting system for coupling the blade track segment to the carrier segment.
Figure 4:
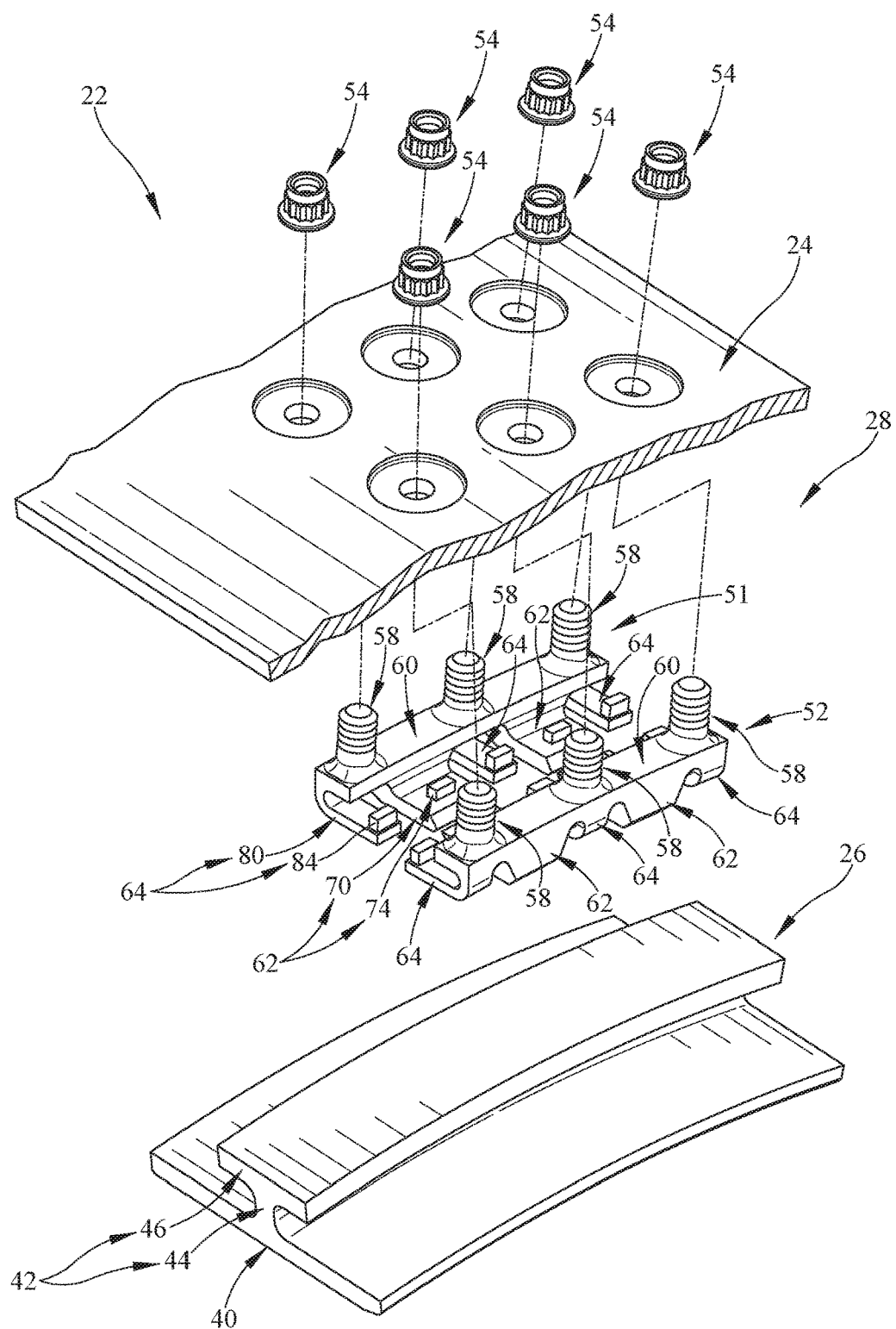
FIG. 4 is an exploded perspective assembly view of the turbine shroud segment of FIGS. 3 and 4 showing that the mounting system includes a plurality of braces each having threaded shafts and a bracket that engages hangers included in a blade track segment.

The turbine shroud 20 extends around the turbine wheel assembly 11 to block combustion products from passing over the blades 13 without pushing the blades 13 to rotate as suggested in FIG. 2. In the illustrative embodiment, the turbine shroud 20 is made up of a number of shroud segments 22, one of which is shown in FIGS. 3 and 4, that each extend only part-way around the central axis A and cooperate to surround the turbine wheel assembly 11. The shroud segments 22 are sealed against one another, such as by strip seal members, to provide a continuous turbine shroud 20. In other embodiments, the turbine shroud 20 is annular and non-segmented to extend fully around the central axis A and surround the turbine wheel assembly 11. In yet other embodiments, certain components of the turbine shroud 20 are segmented while other components are annular and non-segmented.

Each shroud segment 22 includes a carrier segment 24, a blade track segment 26, and a mounting system 28 configured to couple the blade track segment 26 to the carrier segment 24 as shown in FIGS. 3 and 4. The carrier segment 24 is a metallic support component configured to interface with other metallic components spaced from the primary gas path of the engine 10. The blade track segment 26 is a ceramic matrix composite component configured to directly face the high temperatures of the primary gas path. The mounting system 28 is designed to engage the blade track segment 26 so as to distribute mounting and pressure loads applied to the blade track segment 26 across the ceramic matrix composite material making up the component.

The carrier segment 24 included in each shroud segment 22 is coupled to an outer case 30 of the engine 10 as shown in FIG. 2. Each carrier segment 24 illustratively includes a body plate 32, hangers 34, and locating pads 36 as shown in FIG. 3. The body plate 32 extends partway around the axis 11 and is formed to include holes 35 through which the mount system 28 extends. The hangers 34 extend radially outward from the body plate 32 and engage the outer case 30 to couple the turbine shroud segment 22 to the rest of the engine 10. The locating pads 36 extend radially inward from the body plate 32 and contact the blade track segment 26 to help locate the blade track segment 26 relative to the carrier segment 24. The locating pads 36 may be machined to help place the blade track segment 26 in a desired orientation relative to the carrier segment 24.

The blade tracks segment 26 of each shroud segment 22 comprises ceramic matrix composite materials as suggested in FIGS. 2 and 4. The blade track segment 26 is held in place adjacent to tips of turbine blades 13 to block combustion products from passing over the blades 13 without pushing the blades 13 to rotate as suggested in FIG. 2. The blade track segment 26 is illustratively formed to include a runner 40 and an attachment 42. The runner 40 arcuate and extends partway around axis 11 adjacent to turbine blades 13. The attachment 42 extends radially outward from the runner 40 to provide structure for coupling the blade track segment 26 to the carrier segment 24.

In the illustrative embodiment, the attachment 42 of the blade track segment 26 has a T-shape when viewed in the circumferential direction as such that the entire blade track segment has a generally I-beam shape when viewed in the circumferential direction shown in FIGS. 3 and 4. The attachment (or attachment portion) 42 includes a stem 44 that extends radially outward from the runner 40 and an attachment panel 46 that extends radially forward and aft from the stem 44. In other embodiments, the attachment 42 may be provided by L-shaped hangers, fir-tree shaped members, dovetail members, box shape panels, or other suitable features.

Turning again to the mounting system 28, the system 28 includes forward and aft braces 51, 52 along with threaded nuts 54 as shown in FIGS. 3 and 4. The braces 51, 52 are configured to distribute coupling and pressure loads applied to the attachment 42 of the blade track segment 26. The threaded nuts 54 engage the braces 51, 52 to fix the braces 51, 52 in place and to apply coupling load to the blade track segment 26 through the braces 51, 52.

Each brace 51, 52 is substantially similar and are mirror images of one another as indicated by common reference numbers in FIG. 4. Brace 52 includes a bracket 56 and a plurality of threaded attachment shafts 58. The bracket 56 engages the blade track segment 26 to locate and distribute loads along the blade track segment 26. The threaded shafts 58 extend from the bracket 56 through the carrier segment 24 into corresponding threaded nuts 54.

Figure 5:
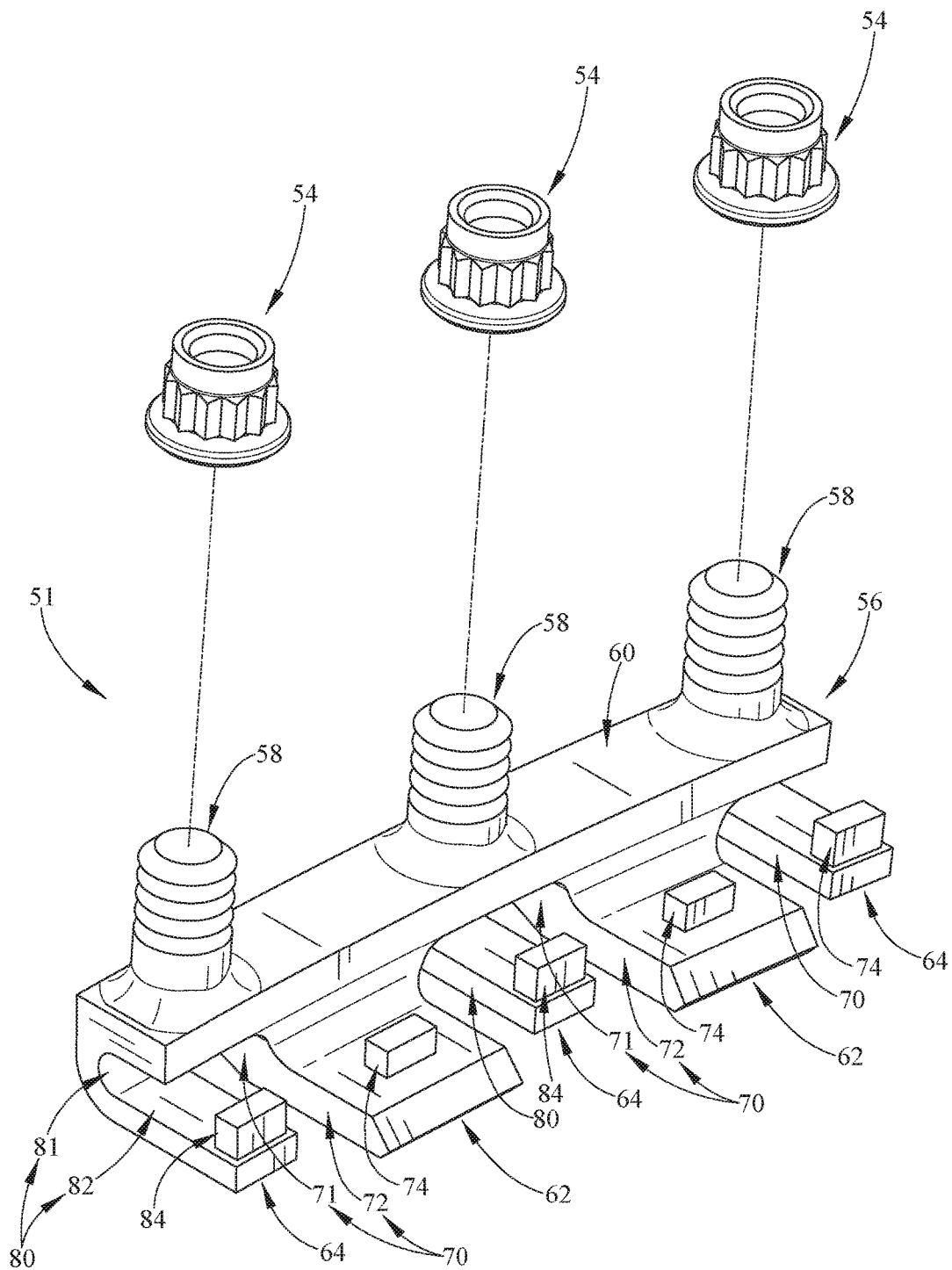
FIG. 5 is a perspective view of one of the braces included in the mounting system of FIGS. 2-4 along with corresponding threaded nuts configured to engage the threaded shafts included in the brace.

Each bracket 56 included in a brace 51, 52 includes a support body 60, track-location arms 62, and load-distribution arms 64 as shown in FIG. 5. The support body 60 is illustratively an arcuate panel from which the threaded shafts 54 and arms 62, 64 extend. The track-location arms 62 engage the attachment 42 of the blade track segment 26 and provide rigid loading points for the blade track segment 26. The load-distribution arms 64 are configured to be less rigid than the track-location arms 62. Accordingly, the load-distribution arms 64 provide spring load points that distribute mounting and pressure loads applied to the blade track segment 26 to locations spaced apart from the rigid loading points provided by the track-location arms 62.

The track-location arms 62 engage the attachment 42 of the blade track segment 26 and are configured to rigidly locate the blade track segment 26 relative to the carrier segment 24 when the shroud segment 22 is assembled. Each track location arm 62 includes a cantilevered boom 70 and an engagement pad 74 as shown in FIG. 5. The cantilevered boom 70 is sized to rigidly hold the blade track segment 26 in place relative to the carrier segment 24 even under clamp and pressure loads applied during operation of the engine 10. The engagement pad 74 directly contacts the blade track segment 26 and provides a control location for managing the orientation/placement of the blade track segment 26 relative to the carrier segment 24.

The cantilevered boom 70 extends from a radially inwardly facing side of the support body 60 as shown in FIG. 5. The boom 70 is illustratively L-shaped and has a first portion 71 that extends radially inward from the support body 60 and a second portion 72 that extends axially from the first portion 71.

The engagement pads 74 extend radially outward from the second portion 72 of the cantilevered boom 70 and are spaced apart from the first portion 71 of the cantilevered boom 70. The engagement pads 74 are designed to be machined to allow for fine positioning of the blade track segment 26 relative to the carrier segment 24 when the shroud segment 22 is assembled while controlling for relatively loose shape tolerance for components of the shroud segment 22.

The load-distribution arms 64 engage the attachment portion 42 of the blade track segment 26 and are configured to distribute loads applied to the blade track segment 26 as suggested in FIGS. 2 and 3. Each load-distribution arm 64 includes a cantilevered boom 80 and an engagement pad 84 as shown in FIG. 5. The cantilevered boom 80 of each load-distribution arm 64 is sized so as to be configured to be less rigid than the cantilevered boom 70 of the track-location arm 62.

The cantilevered boom 80 extends from a radially-inwardly facing side of the support body 60 as shown in FIG. 5. The boom 80 is illustratively L-shaped and has a first portion 81 that extends radially inward from the support body 60 and a second portion 82 that extends axially from the first portion 81.

The engagement pads 84 directly contact the blade track segment 26 at a location spaced apart from the engagement pads 74 of the track-location arms 62. The engagement pads 84 extend radially outward from the second portion 82 of the cantilevered boom 80 and are spaced apart from the first portion 81 of the cantilevered boom 80. The engagement pads 84 are designed to be machined to allow for load distribution adjustments while controlling for relatively loose shape tolerance for components of the shroud segment 22.

Figure 6:
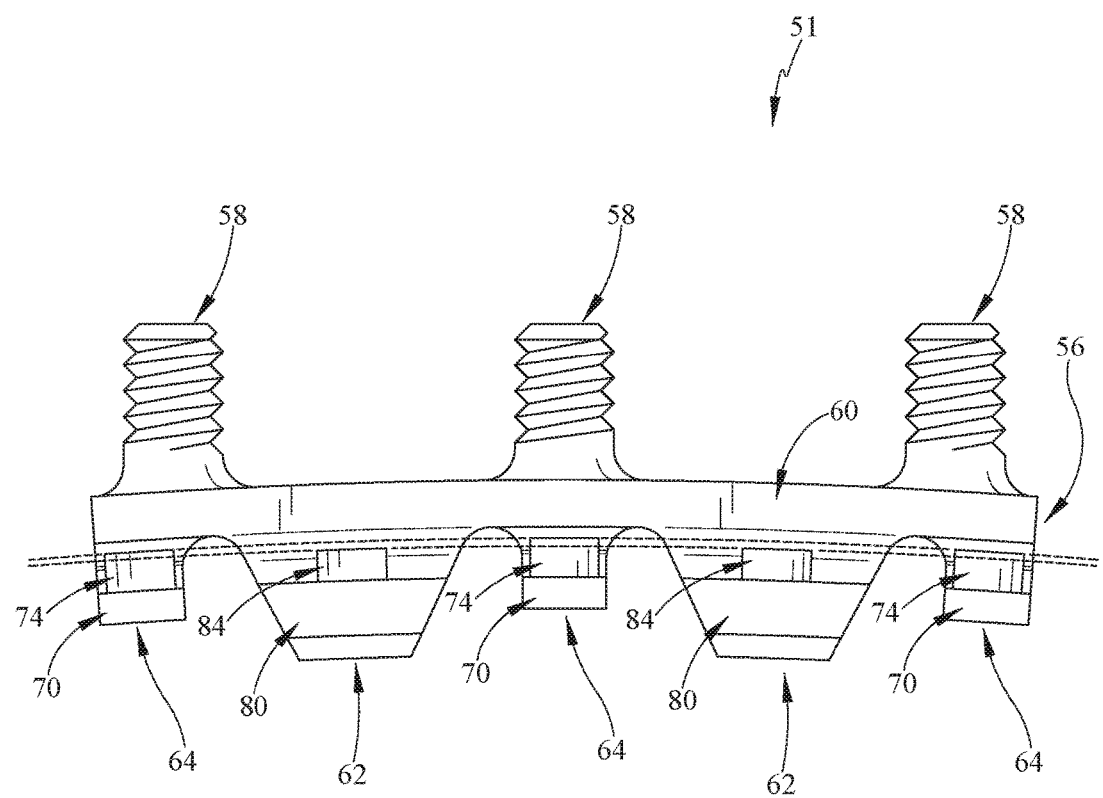
FIG. 6 is an elevation view of one of the braces included in the mounting system of FIGS. 2-4 showing that engagement pads of the load-distribution arms extend radially outward of engagement pads of the track-location arms when the turbine shroud segment is disassembled such that the load-distribution arms will engage the blade track segment and deflect upon assembly with the blade track segment to provide spring load points that distribute mounting loads applied to the blade track segment to locations spaced apart from the rigid loading points provided by the track-location arms.
Figure 7:
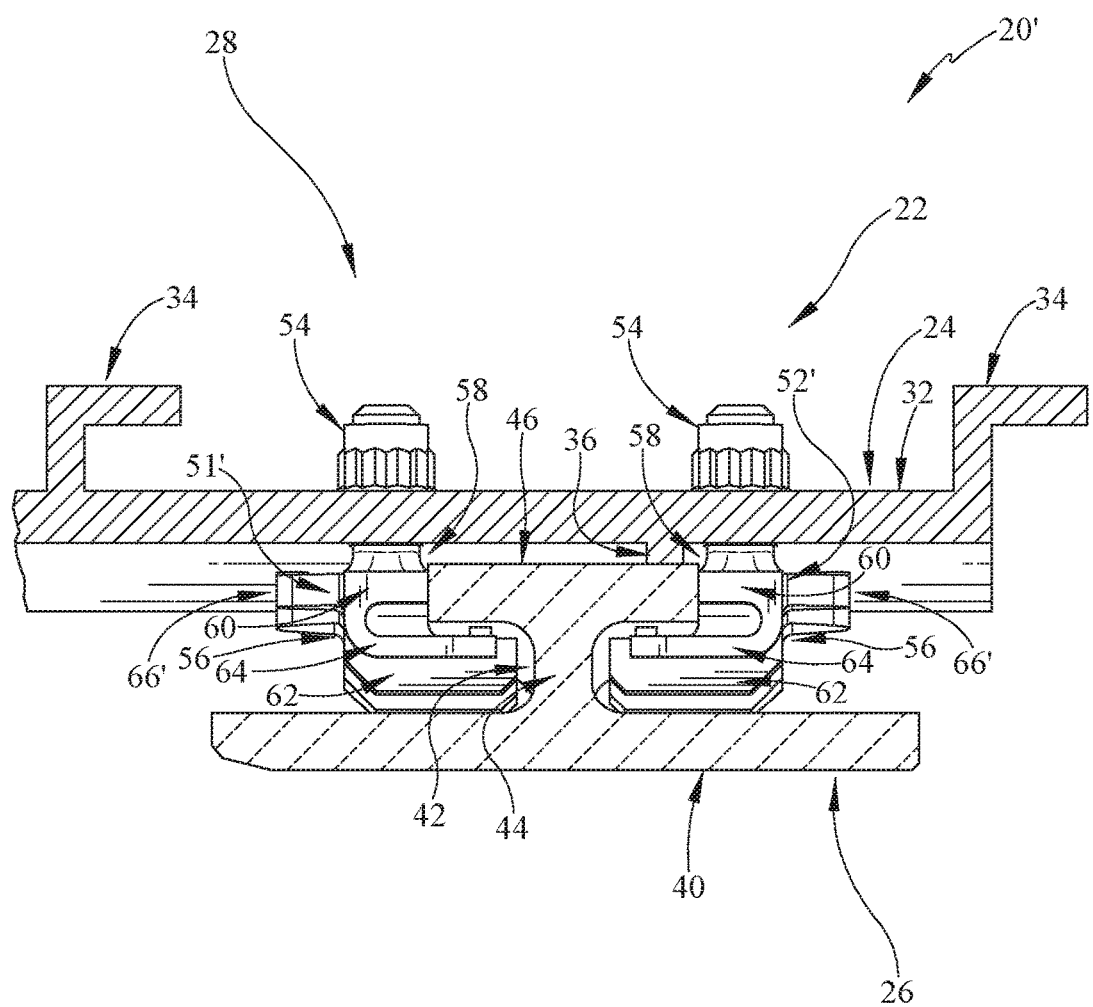
FIG. 7 is a cross-sectional view of a portion of a second turbine shroud segment according to the present disclosure showing that the second turbine shroud segment includes a carrier segment, a blade track segment, and a mounting system for coupling the blade track segment to the carrier segment.
Figure 8:
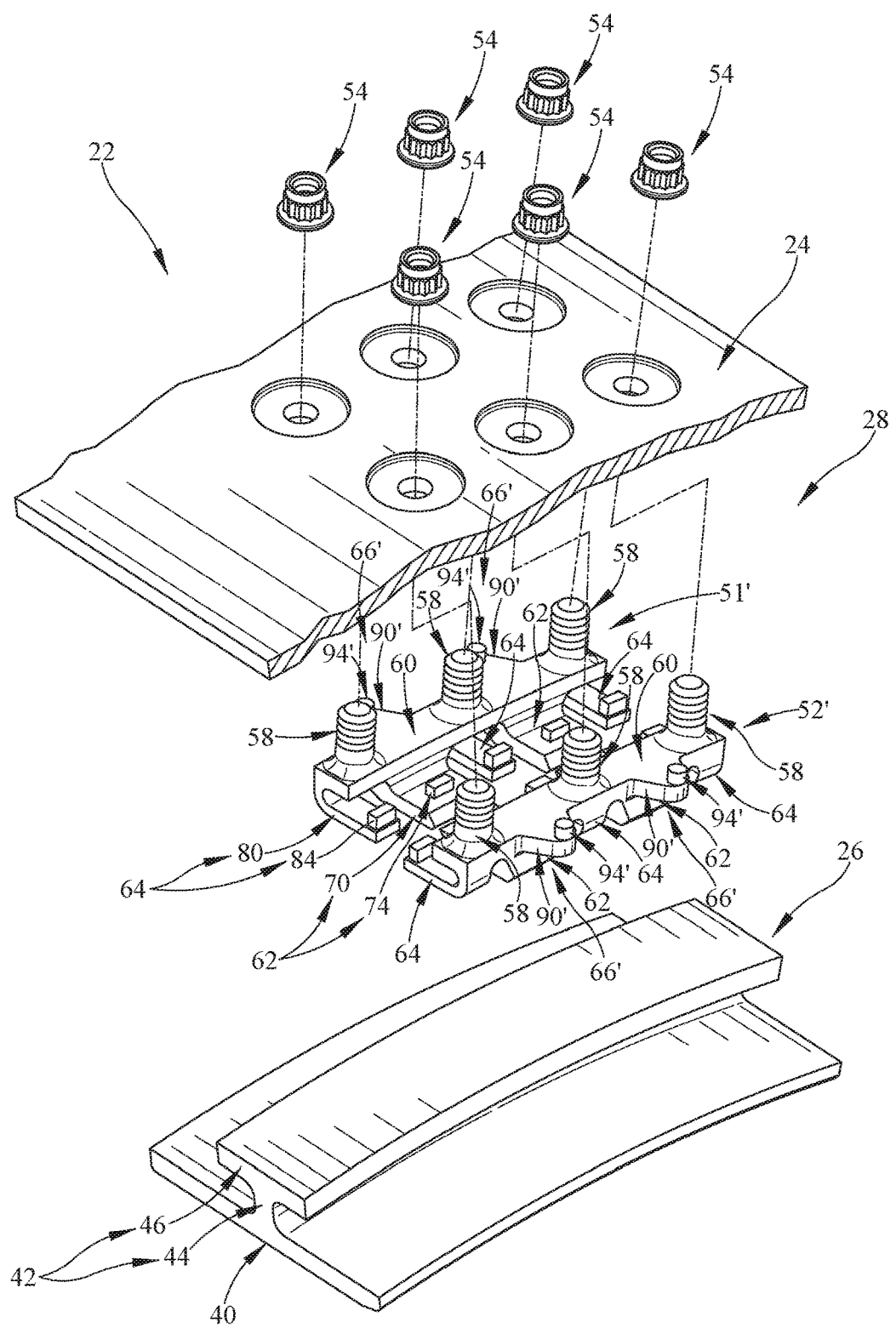
FIG. 8 is an exploded perspective assembly view of the turbine shroud segment of FIG. 7 showing that the mounting system includes a plurality of braces each having threaded shafts and a bracket that engages both the blade track segment and a radially-inwardly facing surface of the carrier segment.

The engagement pads 84 of the load-distribution arms 64 extend radially outward of engagement pads 74 of the track-location arms 62 when the turbine shroud segment 22 is disassembled as shown in FIG. 6. Accordingly, the load-distribution arms 64 will engage the blade track segment 26 and deflect upon assembly with the blade track segment 22 to provide spring load points that distribute mounting loads applied to the blade track segment 26 to locations spaced apart from the rigid loading points provided by the track-location arms 62 when assembly is complete.

In the illustrative embodiment, each brace 51, 52 includes three threaded shafts or studs 58 as shown in FIG. 4. The shafts 58 are parallel to one another to accommodate an assembly step of inserting the shafts 58 through the carrier segment 24 along a linear path into round holes. In the exemplary embodiment, the central shaft 58 extends along a line that intersects the center line of the engine 10. The outer shafts 58 are parallel to the central shaft 58 such that they do not extend perpendicular to the central engine axis.

A second turbine shroud 20' adapted for use in the gas turbine engine 10 is shown in FIGS. 7-10. The second turbine shroud 20' is substantially similar to the turbine shroud 20 described above. Accordingly, similar reference numbers are used to indicate features common to the two embodiments.

Figure 9:
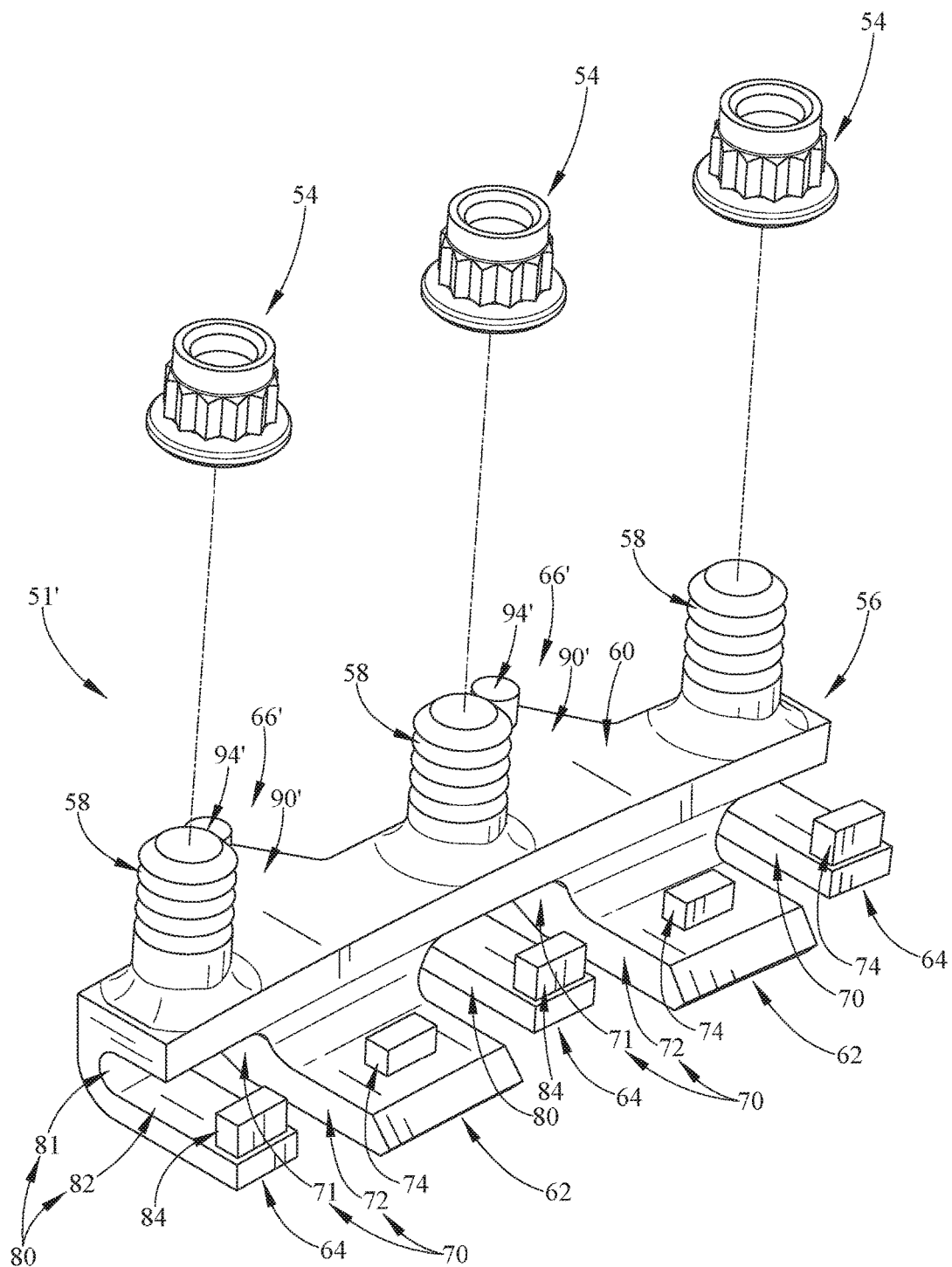
FIG. 9 is a perspective view of one of the braces included in the mounting system of FIGS. 7 and 8 along with corresponding threaded nuts configured to engage the threaded shafts included in the brace.
Figure 10:
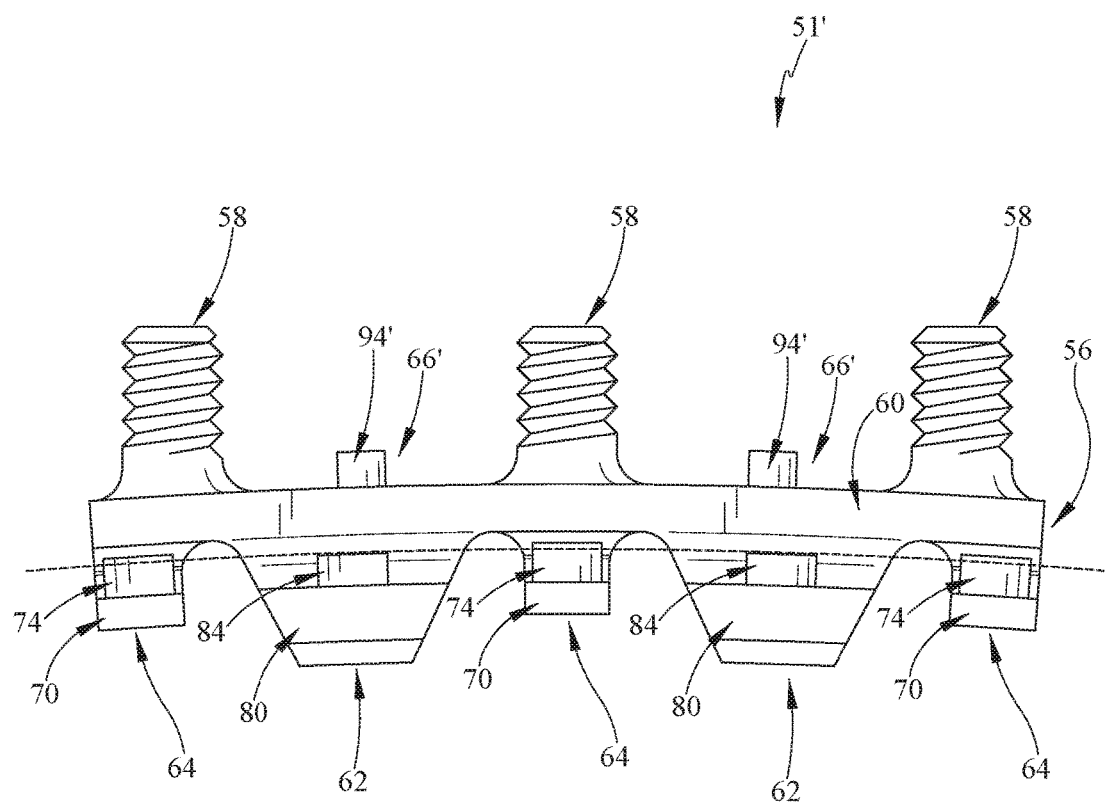
FIG. 10 is an elevation view of one of the braces included in the mounting system of FIGS. 7 and 8 showing that engagement pads of the load-distribution arms extend radially outward of engagement pads of the track-location arms when the turbine shroud segment is disassembled such that the load-distribution arms will engage the blade track segment and deflect upon assembly with the blade track segment to provide spring load points.

Unlike the turbine shroud 20, the turbine shroud 20' includes 51', 52' that include a load-reaction arm 66' as shown in FIG. 9. The load-reaction arms 66' are configured to engage a radially-inwardly facing surface of the carrier segment 24 and to react pressure loads induced onto cantilevered boom 70 of the track-location arms 62 when turbine shroud 20' is used in the engine 10.

The load-reaction arms 66' react moment force induced by pressure applied to blade track segment 26 during use in an engine. The load-reaction arms 66' each include a cantilevered boom 90' and an engagement pad 94' as shown in FIG. 9. The cantilevered boom 90' extends axially from the support body 60 of a corresponding brace 51', 52' in a direction opposite of the track-location arms 62 and the load-distribution arms 64. The engagement pad 94' extends radially outward from the boom 90' and directly contacts the carrier segment 24 to pass load to the carrier segment 24. The engagement pads 94' are designed to be machined to allow for load distribution adjustments while allowing for relatively loose shape tolerance for components of the turbine shroud 20'.

The present disclosure acknowledges that ceramic matrix composite materials are being specifically considered for use in turbine applications but other applications are possible. As specifically discussed, one application for potential ceramic matrix composite use is turbine blade track seal segments (i.e. segments 26). Ceramic matrix composite blade track seal segments 26 used in turbine shrouds often provide high temperature capability and unrelenting pressure load carrying capability. Assemblies incorporating ceramic matrix composite components are often designed to provide accurate position control holding capability. Sometimes, maintaining position of ceramic matrix composite components can be challenged by poor finished part surface profile tolerance and/or sensitivity to localized loads (due to brittleness).

One concept for the ceramic matrix composite blade track seal segment 26 shown in this paper is referred to as the I-beam design. The mechanical retention for this component can be described as including two adjustable height braces 51, 52, sometimes called hangers, with two rigid load points that clamp the seal segment 26 to the carrier 24. The carrier 24 illustratively has three rigid load points that serve as the datum to position the blade track segment 26 radially.

During operation, the pressure differential increases the load onto the rigid load points on the carriers 24. The mounting system 28 of the present disclosure may help distribute the pressure differential reaction load across more than two rigid load points. A plurality of spring supports provided by load-distribution arms 64 is proposed that engage the ceramic matrix composite component (i.e. segment 26) first and receive a controlled amount of preload based on the amount of interference and the characteristic stiffness of the spring support. Two rigid track-location arms 62 are employed to provide the final positioning and primary load support during running conditions. Meanwhile the engaged spring supports will provide load distribution, which relieves the amount of load going through the track-location arms during engine operation. The disclosed configuration will therefore reduce the damaging localization of stress in the somewhat brittle ceramic matrix composite component, and will allow further optimization of the ceramic matrix composite component design.

While the present disclosure specifically teaches the use of a mounting system in a turbine shroud having ceramic matrix composite blade track segments, it is contemplated that other assemblies may benefit from features of the specific design described. In one example, the mounting system and/or other features of the present disclosure may be incorporated into a combustor having ceramic matrix composite liner tiles that surround the combustion chamber. In another example, the mounting system and/or other features of the present disclosure may be incorporated into an exhaust assembly having ceramic matrix composite heat shields. In yet another example, the mounting system and/or other features of the present disclosure may be incorporated into heat shields for spacecraft. Moreover, the teachings of the present disclosure may be applied to any assembly facing high temperature operating conditions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted for use in a gas turbine engine, the turbine shroud segment comprising
   a carrier segment comprising metallic materials,
   a blade track segment comprising ceramic matrix composite materials, the blade track segment formed to include a runner shaped to extend partway around a central axis and an attachment portion that extends radially outward from the runner, and
   a mounting system configured to couple the blade track segment to the carrier segment, the mounting system including a brace formed to include a bracket that engages the attachment portion of the blade track segment and a plurality of attachment shafts that extend from the bracket through the carrier to couple the blade track segment to the carrier segment,
   wherein the bracket of the brace includes a support body from which the plurality of attachment shafts extend, track-location arms that engage the attachment portion of the blade track segment and provide rigid loading points for the blade track segment, and load-distribution arms that engage the attachment portion of the blade track segment, and wherein the load-distribution arms are configured to be less rigid than the track-location arms so that the load-distribution arms provide spring load points that distribute mounting loads applied to the blade track segment to locations spaced apart from the rigid loading points provided by the track-location arms.

2. The turbine shroud segment of claim 1, wherein the track-location arms each include a cantilevered boom that extends from the support body and an engagement pad that extends radially from the cantilevered boom into contact with the attachment portion of the blade track segment.

3. The turbine shroud segment of claim 2, wherein the cantilevered booms of the track location arms are L-shaped and each have a first portion and a second portion, the first portion extends radially inward from the support body and the second portion extends axially from the first portion.

4. The turbine shroud segment of claim 3, wherein the engagement pad of each track-location arm extends radially outward from the second portion of the cantilevered boom and is spaced apart from the first portion of the cantilevered boom.

5. The turbine shroud segment of claim 2, wherein the load-distribution arms each includes a cantilevered boom that extends from the support body and an engagement pad that extends radially from the cantilevered boom into contact with the attachment portion of the blade track segment.

6. The turbine shroud segment of claim 5, wherein the cantilevered boom of each load-distribution arm is configured to be less rigid than the cantilevered boom of the track-location arm.

7. The turbine shroud segment of claim 5, wherein the cantilevered boom of each load-distribution arm is L-shaped and has a first portion and a second portion, the first portion extends radially inward from the support body and the second portion extends axially from the first portion.

8. The turbine shroud segment of claim 7, wherein the engagement pad of each load-distribution arm extends radially outward from the second portion of the cantilevered boom and is spaced apart from the first portion of the cantilevered boom.

9. The turbine shroud segment of claim 1, wherein the mounting system includes threaded nuts engaged with threads formed on the shafts of the brace such that the nuts are configured to be rotated to move the brace relative to the carrier segment.

10. The turbine shroud segment of claim 1, wherein the brace includes the plurality of shafts are circumferentially spaced apart shafts that extend from the bracket through the carrier.

11. The turbine shroud segment of claim 10, wherein at least one of the shafts does not extend perpendicular to the central axis.

12. The turbine shroud segment of claim 1, wherein the attachment portion of the blade track segment has a T-shape when viewed in the circumferential direction with a stem that extends radially outward from the runner and an attachment panel that extends radially forward and aft from the stem such that the entire blade track segment has a generally I-beam shape when viewed in the circumferential direction.

13. The turbine shroud segment of claim 12, wherein the track-location arms and the load-distribution arms engage a radially-inwardly facing surface of the attachment panel included in the blade track segment.

14. A turbine shroud segment adapted for use in a gas turbine engine, the turbine shroud segment comprising
   a carrier segment comprising metallic materials,
   a blade track segment comprising ceramic matrix composite materials, the blade track segment formed to include a runner shaped to extend partway around a central axis and an attachment portion that extends radially outward from the runner, and
   a mounting system configured to couple the blade track segment to the carrier, the mounting system including a plurality of braces and a plurality of threaded nuts engaged with the braces, each brace including at least one threaded shaft that extends through the carrier into a threaded nut and a bracket engaged with the blade track segment,
   wherein the bracket of each brace includes a support body, track-location arms that engage the attachment portion of the blade track segment, and at least one load-distribution arm that is sized to be less rigid than any one of the track-location arms and that engages the attachment portion of the blade track segment.

15. The turbine shroud segment of claim 14, wherein the at least one load-distribution arm includes a cantilevered boom that extends from the support body.

16. The turbine shroud segment of claim 15, wherein the track-location arms each include a cantilevered boom that extends from the support body and that is larger in size than the cantilevered boom of the load distribution arms so as to be more rigid than the load-distribution arms.

17. The turbine shroud segment of claim 15, wherein the cantilevered boom of the load-distribution arm is L-shaped and has a first portion and a second portion, the first portion extends radially inward from the support body and the second portion extends axially from the first portion.

18. The turbine shroud segment of claim 17, wherein each load-distribution arm includes an engagement pad and the engagement pad of each load-distribution arm extends radially outward from the second portion of the cantilevered boom into contact with the attachment portion of the blade track segment.

19. The turbine shroud segment of claim 15, wherein each brace includes a plurality of spaced apart threaded shafts that extend from the support body through the carrier and at least one of the shafts does not extend perpendicular to the central axis.

20. An assembly comprising
a carrier component comprising metallic materials,
a supported component comprising ceramic matrix composite materials, the supported component formed to include a shield portion adapted to face a hot environment when the assembly is in use and an attachment portion that extends from the shield portion, and
a mounting system configured to couple the supported component to the carrier component, the mounting system including a plurality of braces and a plurality of threaded nuts engaged with the braces, each brace including at least one threaded shaft that extends through the carrier component into a corresponding threaded nut and a bracket engaged with the blade track segment, wherein the bracket of each brace includes a support body, component-location arms that engage the attachment portion of the second component, and load-distribution arms configured to be less rigid than the component-location arms that engage the attachment portion of the second component.

* * * * *